US006199165B1

(12) United States Patent
Grunnér

(10) Patent No.: US 6,199,165 B1
(45) Date of Patent: Mar. 6, 2001

(54) METHOD AND APPARATUS FOR SECURE DATA COMMUNICATION

(75) Inventor: Ove Grunnér, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/052,106

(22) Filed: Mar. 31, 1998

(30) Foreign Application Priority Data

Apr. 1, 1997 (EP) ................................. 97650011

(51) Int. Cl.[7] .................................................. H04L 9/00
(52) U.S. Cl. .............................. 713/201; 705/64
(58) Field of Search ..................... 713/201, 153, 713/154; 709/239; 380/33; 705/64

(56) References Cited

U.S. PATENT DOCUMENTS

| 4,802,220 | * | 1/1989 | Marker, Jr. ............................ 380/33 |
| 5,574,870 | * | 11/1996 | Dziennus et al. ..................... 395/309 |
| 5,579,394 | * | 11/1996 | Waldron, Jr. et al. ................. 380/49 |
| 5,703,943 | * | 12/1997 | Otto ..................................... 379/265 |
| 5,826,245 | * | 10/1998 | Sandberg-Diment .................. 705/44 |
| 5,862,220 | * | 1/1999 | Perlman ................................ 380/21 |
| 6,012,144 | * | 1/2000 | Pickett ................................ 713/201 |

FOREIGN PATENT DOCUMENTS

| 0 511 497 | 11/1993 | (EP) . |
| 0 603 596 | 6/1994 | (EP) . |
| 2 154 108 | 8/1985 | (GB) . |

* cited by examiner

Primary Examiner—Robert W. Beausoliel, Jr.
Assistant Examiner—Scott T. Baderman
(74) Attorney, Agent, or Firm—Burns, Doane, Swecker & Mathis, L.L.P.

(57) ABSTRACT

A user system (2) recognises data as being either secure or general (non-secure). The data may be for performing on-line transaction processing or banking via the Internet. The user system (2) transmits the secure data from an ISDN circuit (6) on the D-channel, and the general data on the B-channel. The digital exchange (8) routes the general data via the Internet (12) to a service provider (3). A frame handler in the digital exchange (8) recognises the secure data in the D-channel and routes it via a physically separate telecommunications link (20) to the service provider (3). The alternative route (20) may include a management function connected by leased lines on each side to the exchange (8) and the service provider (3). The service provider (3) merges the secure and general data and performs the usual transaction processing operations.

17 Claims, 3 Drawing Sheets

METHOD AND APPARATUS FOR SECURE DATA COMMUNICATION

BACKGROUND OF THE INVENTION

The invention relates to communication of data between data processing systems in which secure data is transmitted between the systems via a secure channel. The term "secure data" means data which is confidential so that the user wishes to ensure that it has the maximum protection from unauthorised access.

It is quite commonplace for secure data such as credit card numbers to be transmitted via telephone voice channel, via fax transmissions, or using DTMF tones with a telephone. In a limited way, such communication can be quite effective. For example, there is growing use of DTMF interaction for automatic 24-hour on-line banking. This type of communication is regarded as being quite secure.

However, such communication is quite limited and cannot provide the range of services and flexibility which can be provided by systems such as PCs connected to a host system. An example is a connection to an Internet service provider.

It is also known to transmit secure data in a broadcasting system, as described in GB 2154108 (Communications Patents Limited). An arrangement is described in this specification whereby a subscriber selects a secure channel dedicated to the transmission of encrypted data and his or her terminal is temporarily connected to the secure channel. The channel is used for communication of encryption keys. The system includes a channel selector, a secure channel signal generator, and a secure channel selection detector at the head end. The user end includes a receiver, a channel selector controller, a decryptor, an algorithm store, and an encryptor. This system involves much signalling to establish communication and requires special hardware. Further, it does not appear that it would provide the necessary versatility which is required for general communication in which a large portion of the data to be communicated is not necessarily secure data.

SUMMARY OF THE INVENTION

The invention provides a data communication method carried out by mutually remote data processing systems, the method comprising the step of a system transmitting secure data to the other system via a secure channel, wherein in that the method comprises the further steps of:

system identifying category of data as being either secure or general, said system transmitting the general data via a general channel which is at least partly physically separate from the secure channel, and the receiving system receiving both the secure and general data via the secure and general channels and merging it.

Thus, the invention provides a large degree of flexibility because the a system handles both secure data and general data and can simultaneously transmit both types. This also allows a fast response as there are no serial communication delays. The invention thus, for example, allows a PC to communicate with a remote system such as a service provider using an Internet access program to achieve the comprehensive and flexible services which can be provided in this manner, while also ensuring that secure data is transmitted via a secure path. The roles of the receiving and translating systems may be reversed at any time including during a single communications session. This allows bi-directional secure data communication.

In one embodiment, the transmitting system comprises means for automatically identifying data category.

In one embodiment, the transmitting system automatically recognises the category of the data according to programs initially received from the receiving system.

Preferably, the secure channel is a signalling channel associated at the terminating points with the general channel.

In one embodiment, the secure channel has a lower bandwidth than the general channel.

In another embodiment, the method comprises the further step of the receiving system transmitting a secure channel address to the transmitting system, for example, via the general channel.

In one embodiment, both the secure and general data are received by an exchange connected to the transmitting system and the exchange routes secure data via a telecommunications link to the receiving system.

In one embodiment, the exchange routes the secure data to the receiving system via a management function.

In one embodiment, the exchange routes the secure data to the management function via a leased line.

In another embodiment, the management function routes the secure data to a system via a leased line.

Preferably, the management function comprises a matrix correlating remote data processing system addresses used by said systems with addresses for a protocol between the exchange and said systems.

In one embodiment, the secure channel comprises the D-channel of an ISDN connection, and the general channel comprises the B-channel of the ISDN connection.

According to another aspect the invention provides a data communication method carried out by a user system and a remote host system, the method comprising the step of the user system transmitting secure data to the remote system via a secure channel wherein the secure channel includes the D-channel of an ISDN connection, the user system identifies category of data as being either secure or general, the user system transmits the general data via an ISDN B-channel, a digital exchange connected to the user system routes the general data via a non-secure path to the host system and routes the secure data via a physically separate telecommunications link to the host system, and the host system receives both the secure and general data and merges it.

In one embodiment, a digital exchange routes the secure data via a management function to the host system.

In one embodiment, the management function comprises an addressing matrix to allow communication with a large number of host systems requested by the user system.

The invention also provides a data processing system comprising means for transmitting secure data to a remote data processing systems via a secure channel, characterised in that a data processing system further comprises means for identifying category of data as being either secure or general, and transmitting the general data via a general channel which is at least partly physically separate from the secure channel.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE INVENTION

Figure 1:
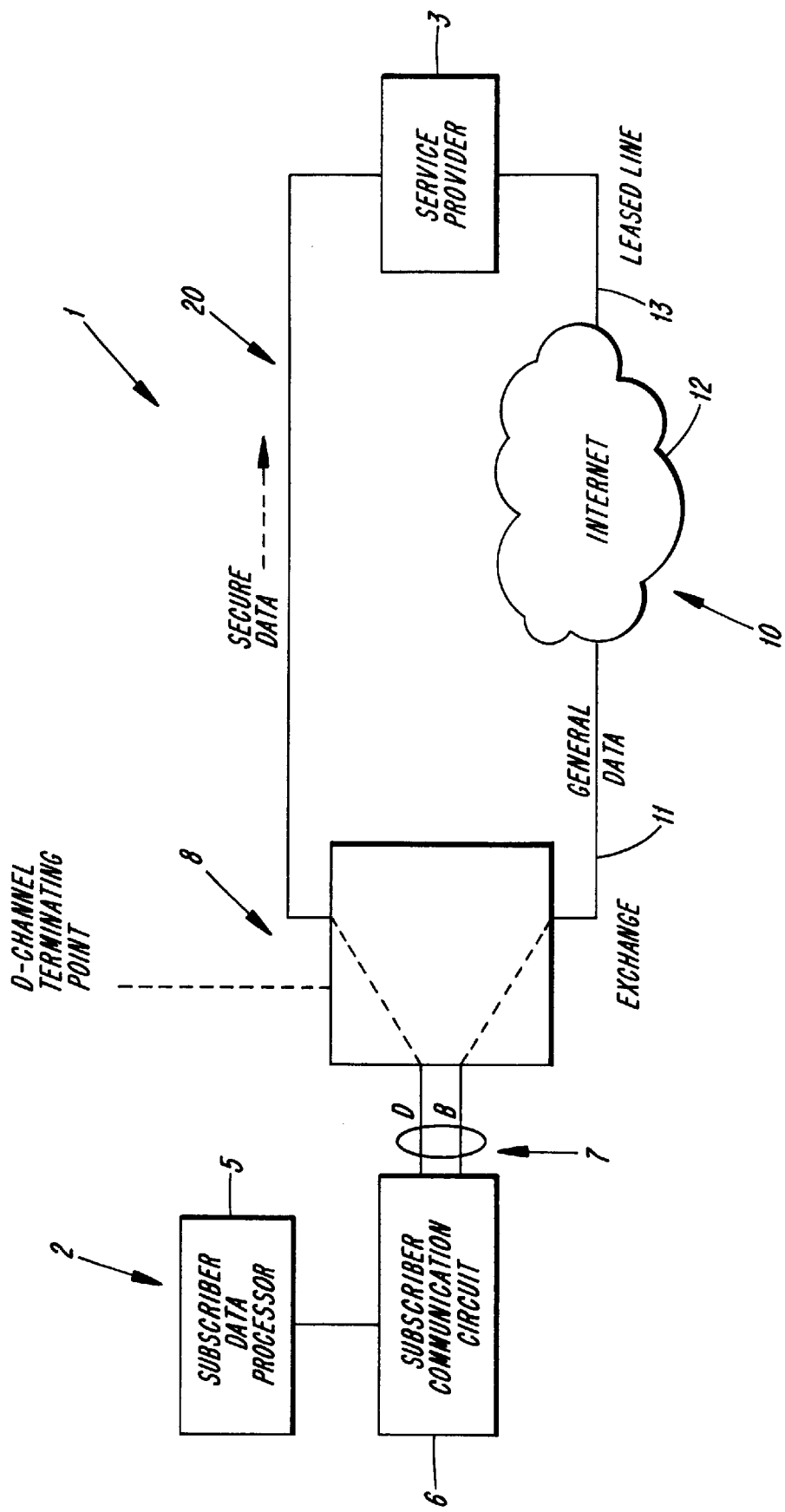
FIG. 1 is a schematic overview illustrating a user system and a remote host system and the manner in which they communicate with each other.
Figure 2:
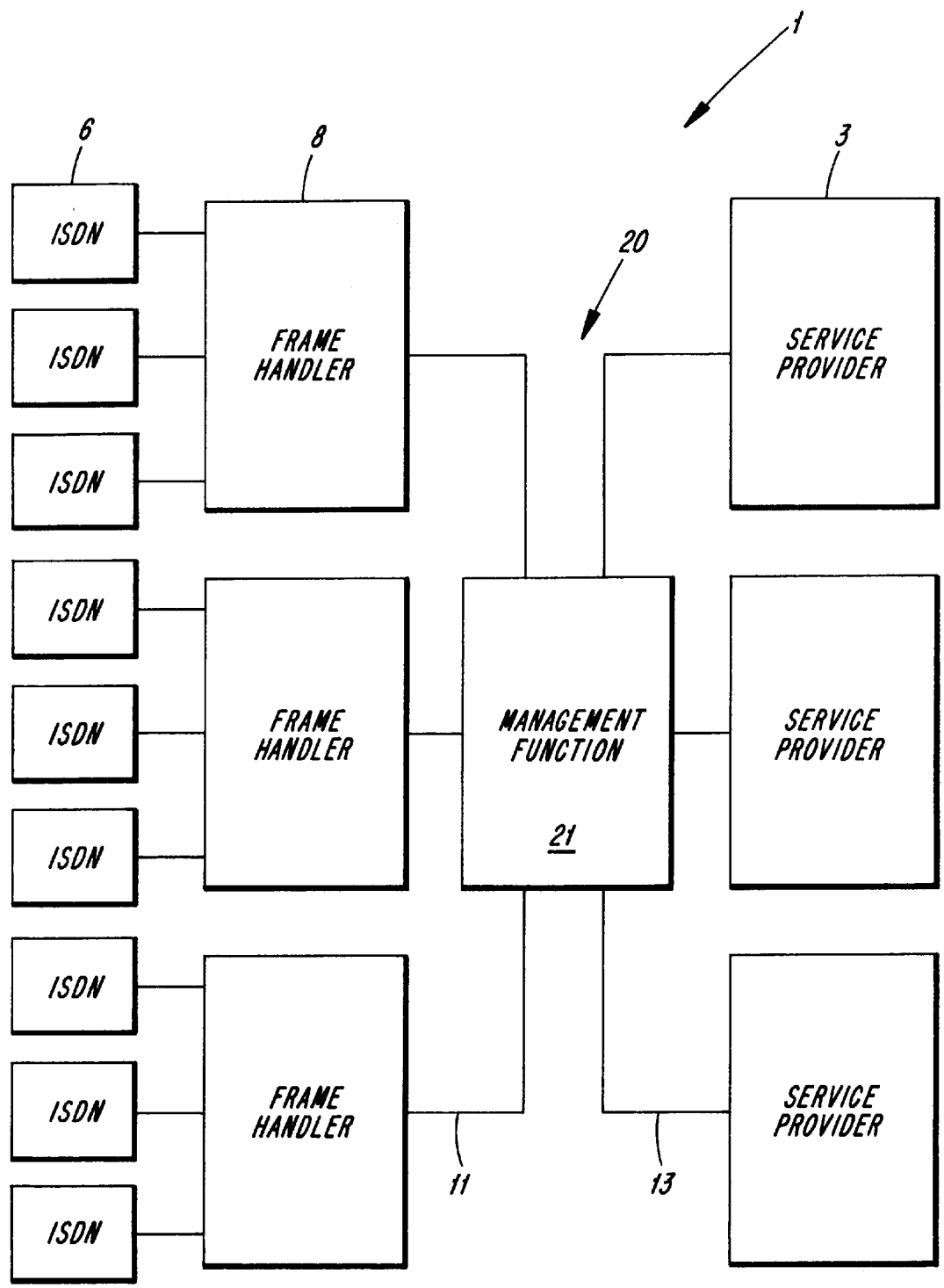
FIG. 2 is a diagram illustrating the manner in which a large number of user systems can communicate with a number of remote host systems.

Referring to FIGS. 1 and 2, there is shown a data processing and communication system 1. The system 1 comprises a number of user systems 2, and a number of remote host systems, in this embodiment Internet service providers 3. However, the system may alternatively comprise just two data processing systems communicating with each other.

Each user system 2 comprises a data processor 5 which is a conventional microcomputer data processor, and a subscriber communication circuit 6 which in this embodiment is a digital ISDN circuit. The data processor is programmed to allow communication for such things as payment of bills and on-line banking generally.

These programs identify data as being either secure or general. Secure data is transmitted on the D-channel of an ISDN line 7, and general data on the conventional B-channel. The ISDN line 7 connects the circuit 6 to a digital exchange 8. The exchange 8 is completely conventional and routes the data transmitted on the D-Channel separately from the B-channel data. Thus, general data is transmitted in conventional manner via the B-channel of the ISDN line 7 and the Internet. However, secure data is transmitted on a secure path comprising the ISDN line 7 D-channel and a telecommunications network linking the exchange 8 and the service provider 3. A telecommunications network link is much more secure than an Internet link.

Figure 3:
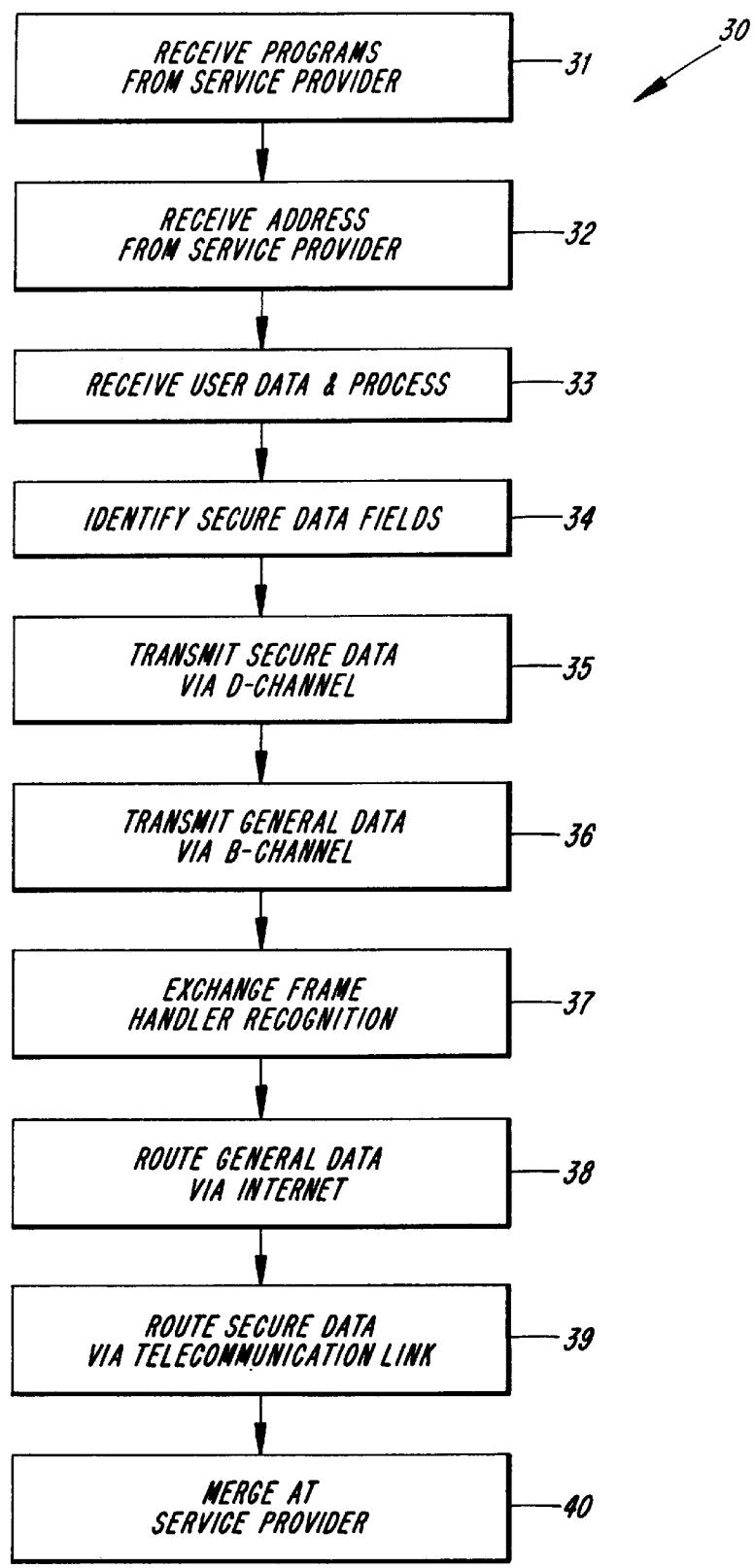
FIG. 3 is a diagram illustrating operation of a user system of FIG. 1.

Referring additionally to FIG. 3, a communication method carried out by the system 1 is described in flow-chart form. In a step 31, the data processor 5 receives programs from the service provider 3 via the ISDN circuit 6. In step 32 the data processor also receives a telecommunications address of the service provider for sending secure data over the secure path. Alternatively, the address may be inputted to the user system by the user after communication by letter or telephone such as upon registration to a service. Thus, in addition to the usual Internet communication address which is used, the subscriber data processor 5 also has a telecommunication address which can be used for secure data communication.

In step 33, the data processor 5 receives user inputs and processes the data using the programs which have been received from the service provider 3. These inputs may, for example, relate to on-line purchasing of goods. In this example financial account data may be regarded as secure. In step 34, the data processor 5 identifies secure data fields within the data. This may be achieved, for example, using templates which are received from the service provider, the templates indicating particular fields for secure data, the remaining being for general data. Alternatively, the user may indicate the secure data by inputting a flag when inputting the data. The important point is that the data processor 5 recognises category of the data as being either secure or general.

The data processor 5 directs operation of the ISDN circuit 6 to transmit a data upload to the service provider 3 in which the secure data is transmitted on the ISDN D-channel in step 35 and the general data is transmitted using the ISDN B-channel in step 36. The D-channel is a low-bandwidth signalling channel which is used for such things as call set-up and call termination. However, there is sufficient bandwidth within this channel to include secure data such as sensitive financial or encryption key data.

In step 37, the frame handler within the digital exchange 5 intercepts the secure data on the D-channel.

The general data is routed in step 38 in the conventional manner to the Internet 12. The connection between the exchange 8 and the first node in the Internet 12 may be a dial-up connection. The final connection between the Internet 12 and the service provider 3 may be a leased line 13. While these first and final links are quite secure, it is generally acknowledged that data transmitted via nodes of the Internet 12 is more open than data transmitted via telecommunication network links. However, this is not a problem as the data is not sensitive.

The frame handler of the digital exchange 8 routes the secure data in step 39 to the service provider 3 on a telecommunications link 20. This is a completely different and physically separate path.

Referring in particular to FIG. 2, the manner in which this is achieved is described in more detail. In this embodiment the telecommunications link includes a management function 21. The management function 21 uses a combination of the sending identity and a terminal endpoint identifier (TEI) value between 0 and 63. The management function 21 has a matrix which selects the final destination of an unlimited number of service providers 3 and transmits it to the destination via a leased line.

It will be appreciated that the link between the exchange 8 and the service provider 3 is completely different for the secure data than for the general data. The telecommunication address which is initially transmitted to the user system is used for identification of the correct service provider in the management function matrix. This path is controlled independently of the general data path—an aspect which is very important for secure communication.

In step 40 of FIG. 3, the service provider 3 merges the secure and general data to complete the necessary transaction processing.

In another embodiment, the exchange frame handler recognises a Service Access Point Identifier (SAPI) of a particular value as being a signal to route the data to the management function 21. In this way, the operation of the frame handler could be integrated with a more general packet switching arrangement whereby the SAPI value can determine whether the management function 21 should be used or general packet switching networks such as the X.25 network should be used. There are many possibilities, the important point being that because the secure data is in a different channel when it is received at the exchange, it may be handled differently and routed via an alternative and physically separate link to the destination service provider. This is achieved simply because the secure data is identified and transmitted on the D-channel. No modification of the exchange is required.

While the invention has been described for use between a user system and a service provider, it is envisaged that it may be used more generally between any two systems which process data and need to communicate secure data between each other. An example is broadcasting of general data and transmission of secure data in parallel on a telecommunications link. Such secure data may include codes or keys for decoding broadcast signals.

The secure channel may be used more extensively in a bi-directional manner.

It is also envisaged that secure and general data paths other than the ISDN D and B channels may be used. For example, the secure data may be transmitted over a dial-up or leased line separately from general data transmitted over the Internet.

The invention is not limited to the embodiment described but may be varied with the scope of the claims in construction and detail.

What is claimed is:

1. A data communication method carried out by mutually remote data processing systems, the method comprising the steps of:

identifying a category of data as being either secure or general in a transmitting system;

transmitting secure data from the transmitting system to a receiving system by a secure channel;

transmitting from the transmitting system the general data via a general channel which is at least partly physically separate from the secure channel; and receiving at the receiving system both the secure and general data via the secure and general channels and merging the secure and general data, wherein the receiving system may receive the secure and general data simultaneously.

2. The method as claimed in claim 1, wherein the identifying step automatically identifies the data category.

3. The method as claimed in claim 2, wherein the transmitting system automatically recognizes the category of the data according to programs initially received from the receiving system.

4. The method as claimed in claim 1, wherein the secure channel is a signaling channel associated with terminating points of the general channel.

5. The method as claimed in claim 4, wherein the secure channel has a lower bandwidth than the general channel.

6. The method as claimed in claim 1, further comprising the step of the receiving system transmitting a secure channel address to the transmitting system.

7. The method as claimed in claim 1, wherein both the secure and general data are received by an exchange connected to the transmitting system and the exchange routes secure data via a telecommunications link to the receiving system.

8. The method as claimed in claim 7, wherein the exchange routes the secure data to the receiving system via a management function.

9. The method as claimed in claim 8, wherein the exchange routes the secure data to the management function via a leased line.

10. The method as claimed in claim 8, wherein the management function routes the secure data to a system via a leased line.

11. The method as claimed in claim 8, wherein the management function comprises a matrix correlating data processing system addresses used by said systems with addresses for a protocol between the exchange and said systems.

12. The method as claimed in claim 1, wherein the secure channel comprises a D-channel of an ISDN connection, and the general channel comprises a B-channel of the ISDN connection.

13. A data communication method carried out by a user system and a remote host system, the method comprising the steps of:

transmitting secure data from the user system to the remote system via a secure channel, wherein the secure channel includes a D-channel of an ISDN connection;

identifying data in the user system as being either secure or general;

transmitting the general data from the user system via an ISDN B-channel;

routing the general data via a non-secure path by a digital exchange from the user system to the host system; and routing the secure data via a physically separate telecommunications link by the digital exchange from the user system to the host system, wherein the general data and secure data may be transmitted simultaneously and wherein the host system receives both the secure and general data simultaneously and merges the secure and general data.

14. The method as claimed in claim 13, wherein a digital exchange routes the secure data via a management function to the host system.

15. The method as claimed in claim 14, wherein the management function comprises an addressing matrix to allow communication with a large number of host systems requested by the user system.

16. A data processing system comprising:

means for identifying data as being either secure or general;

means for transmitting the secure data to a remote data processing system via a secure channel; and means for transmitting the general data via a general channel which is at least partly physically separate from the secure channel, wherein the general data and secure data may be transmitted simultaneously.

17. The system as claimed in claim 16, wherein the means for identifying data automatically identifies data as being either secure or general.

* * * * *